(12) United States Patent
Clark et al.

(10) Patent No.: US 10,493,549 B2
(45) Date of Patent: Dec. 3, 2019

(54) ELECTROCHEMICAL POLISHING OF NON-UNIFORM FEATURES

(71) Applicant: ROLLS-ROYCE PLC, London (GB)

(72) Inventors: Daniel Clark, Derby (GB); Andrew R Walpole, Derby (GB)

(73) Assignee: ROLLS-ROYCE plc, London (GB)

( * ) Notice: Subject to any disclaimer, the term of this patent is extended or adjusted under 35 U.S.C. 154(b) by 232 days.

(21) Appl. No.: 15/598,666

(22) Filed: May 18, 2017

(65) Prior Publication Data

US 2017/0355032 A1   Dec. 14, 2017

(30) Foreign Application Priority Data

Jun. 9, 2016 (GB) .................................. 1610057.0

(51) Int. Cl.
  *B23H 7/18* (2006.01)
  *B23H 3/04* (2006.01)
  *B23H 3/08* (2006.01)

(52) U.S. Cl.
  CPC ............ *B23H 7/18* (2013.01); *B23H 3/04* (2013.01); *B23H 3/08* (2013.01)

(58) Field of Classification Search
  CPC ...................................................... B23H 3/04
  USPC ................................................ 205/652–654
  See application file for complete search history.

(56) References Cited

U.S. PATENT DOCUMENTS

| 3,372,099 A * | 3/1968 | Clifford ............... B23H 3/04 148/277 |
| 5,225,053 A | 7/1993 | Frembgen |
| 5,820,744 A | 10/1998 | Edwards et al. |
| 5,876,454 A | 3/1999 | Nanci et al. |
| 8,168,046 B2 * | 5/2012 | Clark ................. B23P 6/002 204/245 |
| 9,573,212 B2 * | 2/2017 | Chang ................. B23H 3/02 |
| 2003/0155255 A1 | 8/2003 | Yahalom et al. |
| 2007/0087215 A1 | 4/2007 | Sauer |

(Continued)

FOREIGN PATENT DOCUMENTS

| GB | 1238944 A | 7/1971 |
| WO | 2013/081000 A1 | 6/2013 |

OTHER PUBLICATIONS

Dec. 5, 2016 Search Report issued in British Patent Application No. 1610057.0.

(Continued)

*Primary Examiner* — Nicholas A Smith
(74) *Attorney, Agent, or Firm* — Oliff PLC (57) ABSTRACT

A method of controlling a working gap between one or more cathodic tools and an anodic workpiece in an electrochemical material dissolution process, the method comprising: providing a cathodic tool and an anodic workpiece defining a working gap therebetween, the cathodic tool and the workpiece being at least partially immersed in a conductive electrolyte solution; providing a negative electrical potential to the cathodic tool; monitoring one or more of the electrical potential, current, current density and charge between the cathodic tool and the anode to determine the working gap between the cathodic tool and the anode; and, controlling one or more process parameters to maintain one or more of the working gap and electrochemical working conditions between the cathodic tool and anodic workpiece at a targeted value.

15 Claims, 4 Drawing Sheets

(56) References Cited

U.S. PATENT DOCUMENTS

2012/0141816 A1    6/2012   Idrisov et al.
2013/0193000 A1*   8/2013   Platz ........................ B23H 9/02
                                                                          205/653

OTHER PUBLICATIONS

Andrew J. Wain. "Electrochemical Scanning Probe Microscopy for Catalyst Characterisation". National Physical Laboratory, Teddington, UK.

Georg H. W. Leuenberger. "Electrostatic Density Measurements in Green-State PM Parts". Worcester Polytechnic Institute, Apr. 2003.

* cited by examiner

ELECTROCHEMICAL POLISHING OF NON-UNIFORM FEATURES

FIELD

The present disclosure relates to an electopolishing tool and supporting system. In particular, it relates to a means of detecting and compensating for variations in article field concentrations which would otherwise lead to anisotropic material removal.

BACKGROUND

In the drive for modern and efficient methods of dimensional control and surface processing, a process which is under-utilised is electro-polishing. Electropolishing, also known as electrochemical polishing, electrolytic polishing, or electrolytic etching, electrochemical machining (ECM), or electrochemical material dissolution is a process that removes material from the surface of a metallic article, usually maintaining a physical stand-off or separation of a tool relative to the surface of the article. Such tools are commonly shaped according to specific contours or shapes required of the finished article.

Electropolishing is typically utilised in the metal finishing industry for applications requiring, for example, one or more of polishing, etching, passivating and deburring metallic components. In particular, electropolishing can be used to machine articles of complex geometry and/or materials which are otherwise difficult to machine, with high degrees of accuracy and without imparting the levels of residual stress or mechanical deformation of surface layers observed when using traditional machining methods. As such, electropolishing provides the advantage of providing clean and smooth surfaces, allowing the capability to reduce the height or depth of micro peaks and valleys, whilst providing localised material removal material in pre-determined areas.

Whilst providing several advantages, there are known issues associated with electropolishing, particularly in detecting non-uniform metal removal. Here, the differences in surface profile are most typically fairly subtle, often being in the order of tens of microns or less and so challenging the resolution and capabilities of available geometrical inspection methods. For hot isostatic pressed (HIP) components formed from powder constituents, it is known that regions of remnant canister inter-diffused material may remain following electropolishing. The described areas may look visually similar in terms of colour, roughness and reflectivity, making these regions of non-compliant chemistry hard to detect.

Electropolishing is also used in the removal of material from articles of complex geometry including, for example, non axi-symmetric features such as bosses, internal and external corners, and sharp changes in section. As such, electropolishing may be used in the manufacture of pressure vessels and/or aerospace articles such as disks, drums, bladed discs and bladed drums. When considering such articles, such complex geometries may lead to field concentrating features, which may in turn lead to anisotropic material removal. Here, slight deviations in article geometry may lead to such field concentrating or diluting features removing more or less material than would otherwise be required. Such anisotropy can be difficult to detect and rectify following treatment as an in-process monitoring system which seeks to monitor local effects is not presently known. Instead, known systems tend to operate at resolutions corresponding to the scale of the entire article rather than the scale of the material removal itself. Accordingly, the level of removed material is difficult to quantify when operating at low orders of magnitude.

In addition, checking for retained canister material, material defects, or non-process conformance using non-destructive methods is challenging, particularly on articles of complex geometry including areas of rapidly changing contour features. Thus, the ability to test material removal in areas associated with an increased risk of non-conformance using economically viable methods is challenging.

It would therefore be advantageous to provide a reliable apparatus and method for the electropolishing of an article of complex geometry by incorporating an associated means of process control without the aforementioned disadvantages.

SUMMARY

According to a first aspect of the invention there is provided a method of controlling an electrochemical material dissolution process, the method comprising providing a cathodic tool and an anodic workpiece defining a working gap therebetween, the cathodic tool and the anodic workpiece being at least partially immersed in a conductive electrolyte solution; providing a negative electrical potential to the cathodic tool; monitoring one or more of the electrical potential, current, current density and charge between the cathodic tool and the anodic workpiece to determine the working gap between the cathodic tool and the anodic workpiece; and controlling one or more process parameters to maintain one or more of the working gap and electrochemical working conditions between the cathodic tool and the anodic workpiece at a targeted value.

Advantageously, by inspecting and utilising real-time feedback control, it is possible to remove the requirement for post-process inspection, aiding in the avoidance of non-quality and increasing productivity, whilst providing a significant reduction in both processing time and cost. In such a manner, examples according to the present disclosure also enable advances in real-time precision control of wall thickness and material removal, allowing strict tolerance margins to be met without variation caused by tooling age or condition.

The anodic workpiece may be at least partially comprised of a metallic material.

A metallic article may be treated as part of a non-metallic assembly or wider article, such as, for example, a metallic leading edge as part of a casing, pipe, composite fan blade, or a substantially metallic article, such as for example, a drum, aerofoil, disk, or bladed disk.

The anodic workpiece may comprise a metallic aerospace article such as, for example, a casing, pipe, disc, bladed disk, drum, bladed drum, ring, bladed ring or aerofoil.

The process parameters may comprise one or more of working gap, electrical potential, voltage, current, current density, charge, resistance, cathodic tool feed rate, processing time, cathodic tool depth, electrolyte flow rate and/or pressure, temperature and electrolyte chemistry.

The electrical response between the anode and the cathodic tool may be a function of voltage and/or current resulting from the proximity of the cathodic tool relative to the anodic workpiece, but may also vary on the movement of the article with a given electrolyte chemistry. Further commonly used electrical parameters may alternatively be used. For example, electrical potential might be tracked with known position of the electrode, a movement of the electrode or a relative movement between the electrode and the article. Electrical potential may alternatively or additionally be linked to a rotary position of the component, particularly where non-axisymmetric features project at known radial intervals. In this way, an aerospace article such as, for example, a casing with bosses may be rotated such that the electrode tracks the changing radial position as the casing rotates. In addition, it may be appreciated that the voltage signal may be linked to measurements of one or more of electrolyte temperature and conductivity.

The controlling step may comprise comparing or correlating one or more of the electrical potential, current, current density and charge between the cathodic tool and the anodic workpiece with sample or real-time data to convert one or more of the electrical potential, current, current density and charge between the cathodic tool and the anode into an estimation of the working gap.

From calibration of the electrochemical response of the surface, it may be possible to infer one or more of stand-off and local geometry. From known geometric reference points and known cathodic tool positions resulting from pre-existing data, or alternatively a target value or reference point, the relative positions of other article features may be determined such that one or more of spatial and geometrical information may be obtained.

Optionally, one or more of the cathodic tools may comprise one or more cathodic heads.

The or each cathodic tool or head may be at least partially contoured to aid in the formation of a particular geometric contour.

Furthermore, a specific contour may be obtained to replicate the geometric contour of the or each cathodic tool or head via electrolytic interaction of the cathode with the surface of the anodic article. Thus, the working gap between the or each cathodic tool or head may be varied relative to the anodic article.

By manipulating the cathodic tool locally, opportunities for local process optimisation may be enabled which may permit one or more of enhanced and shortened cycle time.

The working gap of the cathodic heads may be independently varied according to pre-set points, electrochemical working conditions or offset values. Electrochemical working conditions or offset values may be additionally refined over time with accumulated processing information and associated feedback.

The detection and control systems may operate via calibration between both the electrical and geometrical responses, such that local electropolishing conditions can be optimised to provide the required amount of material removal. It will be appreciated that this may include manipulation of the article relative to the apparatus, or manipulation of the apparatus relative to the anodic article.

The or each cathodic head may comprise an insulating tip, guide portion or member to provide the working gap between each of the one or more cathodic tools and the anodic workpiece.

Advantageously, the or each insulating tip may be replaced to alter the datum stand-off.

The or each cathodic tool may engage with the article. The tip may be withdrawn from engagement in accordance with one or more of the control or actuation systems.

The or each cathodic tool may be individually displaceable such that the fully extended tip position corresponds to the correct location to remove the required amount of material.

The electrolyte may have a pH of 7 or less.

The electrolyte may comprise one or more sulfuric acid, phosphoric acid, mixtures of perchlorates with acetic anhydride and methanolic solutions of sulfuric acid. Alternatively, the electrolyte may have a pH of 7 or more.

The electrolyte may comprise an ionic liquid solution. It will be appreciated that many electrolyte solutions are known to exist, many of which may be particularly suitable for use in specific applications.

Such electrolyte solutions may comprise a deep eutectic solvent. The electrolyte solution may alternatively comprise one or more of methane sulphonic acid, glycolic acid mixtures and choline chloride.

The electrolyte may comprise a molten salt solution.

A facing surface of the cathodic tool may be at least partially contoured, the facing contour of the cathodic tool or head at least partially replicating the desired shape of at least a portion of the workpiece.

The face of the cathode in closest proximity to the article may include at least one complex contour, the contour at least partially replicating the desired shape of at least a portion of the metallic article such that the contour may be at least partially replicated on the surface of the article.

The present disclosure accordingly provides, in a second aspect, an electrochemical material dissolution apparatus configured to remove material from a surface of an anodic workpiece, the apparatus comprising: at least one cathodic tool; an electrical source configured to provide one or more of a controllable voltage and a controllable current to the cathodic tool; an electrical detection device configured to monitor one or more of electrical potential, current density, charge and current applied to the cathodic tool so as to determine a working gap between the cathodic tool and the anodic workpiece; the electrical detection device further comprising an actuation system configured to control process parameters to maintain one or more of the working gap and electrochemical working conditions between the cathodic tool and the anodic workpiece at a targeted value.

The present disclosure provides an apparatus for controlling the working gap between the cathode and the article surface so as to provide increased accuracy and process control when removing a targeted quantity or known thickness of material from a predetermined location on the surface of a metallic article.

Examples according to the present disclosure may be used to process the canister internal surfaces prior to powder fill and hot isostatic pressing (HIP), or in post processing for one or more of diffusion bonding and super plastic forming, hot creep forming (alpha-case control), hot isostatic pressing of titanium metal matrix composites, aerofoil tips, leading or trailing edges, and non-aerospace applications such as article preparation or finishing of articles for use in nuclear power generation applications.

It will also be appreciated that the process may be applied to other etching and electropolishing operations for dimensional and surface profile control in addition to post-HIP operations.

Examples according to the present disclosure may be applied to control surfaces for non-destructive testing (NDT) inspections and for post welding alpha-case removal or electron beam welding; or may alternatively be applied in electro-plating techniques.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE PREFERRED EXAMPLES

Figure 1:
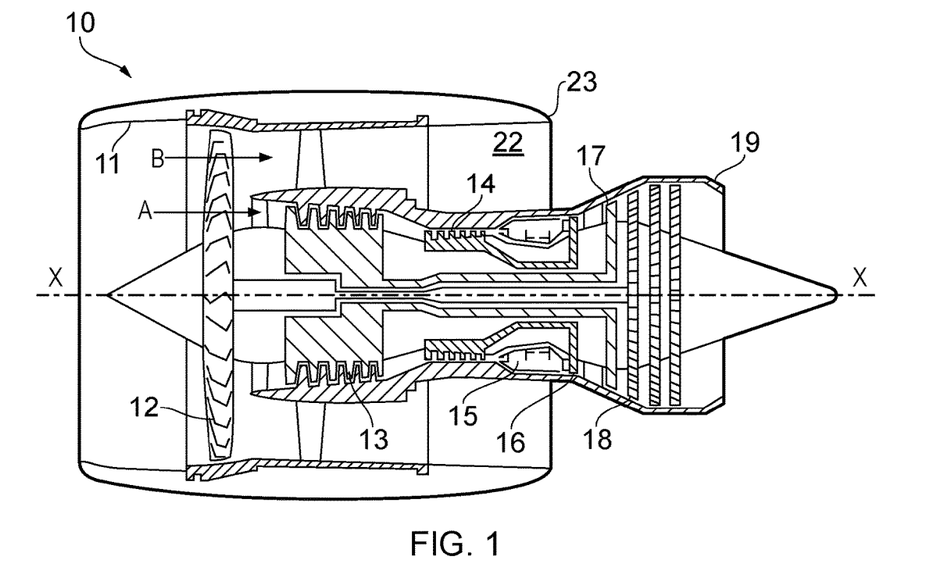
FIG. 1 shows a schematic longitudinal cross-section through a ducted fan gas turbine engine.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

A system is described herein for the electropolishing of a component of complex geometry including, for example, aerospace components such as disks, drums 30, bladed discs and bladed drums as part of the propulsive fan 12, an intermediate pressure compressor 13, a high-pressure compressor 14, by incorporating a feedback control loop and an associated means of process control.

Figure 2:
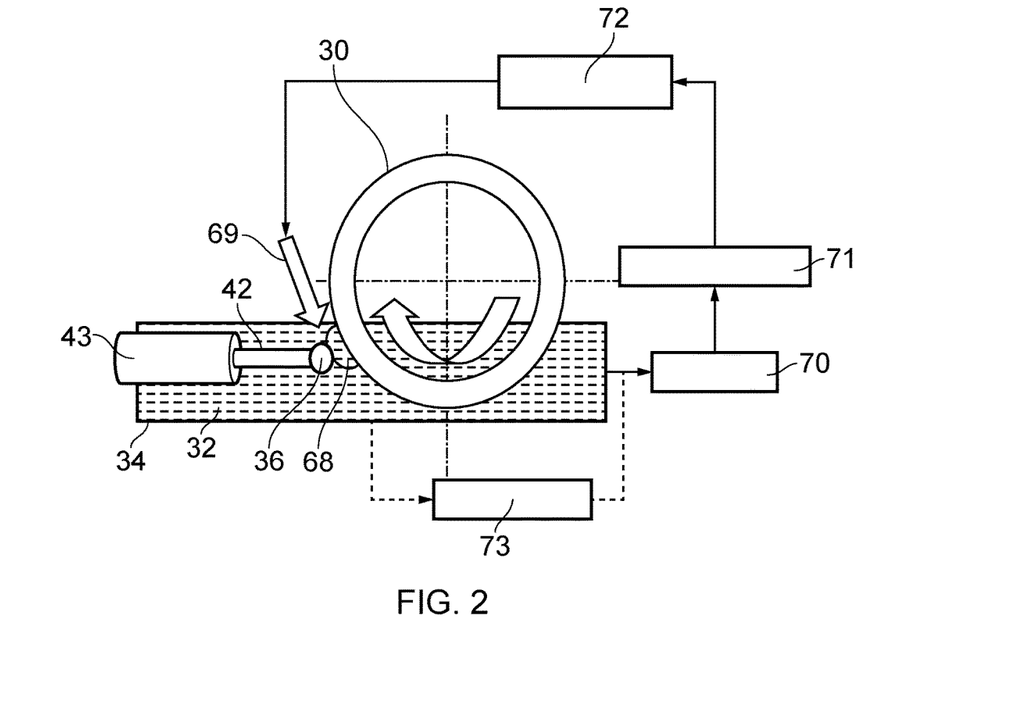
FIG. 2 shows a cathode tool machining an external face of a non-axisymmetric article in accordance with an example of the present disclosure.

FIG. 2 shows a cross-section of an electrochemical material dissolution/electropolishing. The apparatus of FIG. 2 is arranged around an article 30 to be treated, the article 30 of FIG. 2 being, for example, a component or workpiece such as a drum commonly known within the art. Typically, the electropolishing process requires that the article 30 be partially or entirely submerged in a temperature-controlled bath of electrolyte 32, the article 30 itself being used within the system as an anode. Following total or partial submersion within the electrolyte, the anodic article 30 is connected to the positive terminal of a DC power supply and the negative terminal is attached to a cathodic tool 36 which forms the cathode.

During use, current passes from the negatively charged electrode cutting tool (hereinafter referred to as the cathode 36) to the positively charged conductive article or workpiece (hereinafter referred to as the anode 30) via a conductive electrolyte solution 32, the cathode cutting tool 36 being guided along a desired path which is adjacent to, but which does not contact the anode 30. In doing so, metallic matter at the surface of the article 30 is dissolved within the electrolyte 32 (also known as an electrolytic solution or fluid) by the cathode 36 advancing towards the conductive anode 30. The stand-off distance, also known as the working gap 68, is most readily described as the controlled distance between the positively charged anode 30 and negatively charged cathode 36. Traditionally, the working gap 68 varies according to process parameters within the range of about 80-5000 micrometers. However, it will be appreciated that a working gap 68 below or above this range, for example about 1-10,000, about 1-20,000 micrometers or about 1-100,000 micrometers may be appropriate for use in particular applications. It will also be appreciated that process parameters may also be varied and/or tailored to suit such applications.

Figure 3:
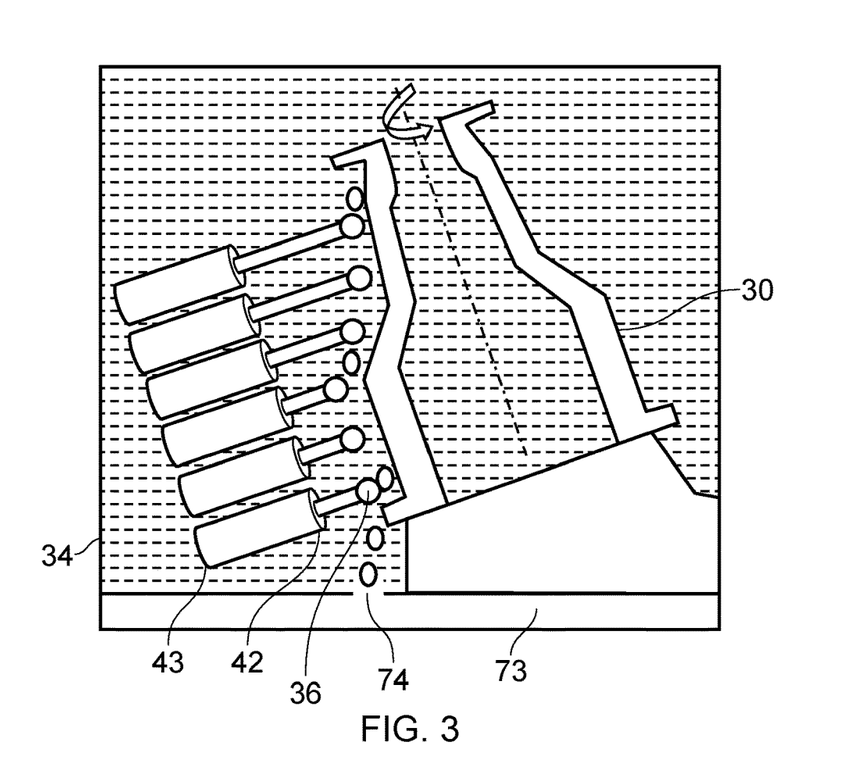
FIG. 3 shows a contained and sprung probe element in accordance with an example of the present disclosure.

During operation, electrons cross the working gap 68 formed between a surface of the cathode 36 facing the anode 30, and a surface of the anode 30 facing the cathode 36. Through electrons crossing the working gap 68 between the cathode 36 and the anode 30, material from the anode 30 is dissolved and the cathodic tool 36 forms the desired shape in the anodic article 30, with the electrolyte 32 carrying away one or more waste products. Such waste products comprising metal hydroxide, ions or gaseous waste products are formed following a reduction reaction at the cathode 36. In particular, the reaction produces hydrogen which, following collection by the electrolyte 32, may be collected or vented to atmosphere. Electrolytes 32 are commonly formed from solutions or mixtures incorporating concentrated acidic solutions, typically of increased viscosity. Such electrolytes 32 include sulfuric and phosphoric acids, although electrolytes 32 may also include mixtures of perchlorates with acetic anhydride and methanolic solutions of sulfuric acid. Electrolytes 32 commonly comprise an acidic base so as to ensure that the metal from the cathode 36 is dissolved into solution during the electrochemical material dissolution process. This ensures that the dissolved material will not create an electrical bridge or 'short' between the cathode 36 and anode 30. As such, material removed from the anode 30 is dissolved into solution in the electrolyte 32 instead of forming a sludge which could one or more of clog and bridge the working gap 68. Alternatively, further solutions of less aggressive chemicals or constituent ingredients may be used, with ionic liquids or liquid salt solutions and aqueous solutions, for example, also being known for use in such methods. Such solutions may be used in conjunction with various mechanisms to increase flow of electrolyte through the working gap 68 in order to prevent a build-up of sludge. Such systems can include, for example, gas bubble flowing, as shown in FIG. 3, to create agitation for and/or replenish locally spent fluid. Such a process can be used intermittently in conjunction with sensing and/or working gap 68 detection equipment to be used during or in-between sensing processes. It will be appreciated that many electrolyte solutions 32 are known to exist, many of which may be particularly suitable for use in the presently described application.

To achieve material removal and a general flattening, electropolishing necessarily requires that asperities on the surface of the anode 30 dissolve faster than the recesses. This occurs due to increased current density at the points on the anode 30 closest to the cathode 36. As such, current density is typically at its highest at the uppermost points of the anode 30 within a specific treatment area. Such points typically include corners, burrs or asperities forming the surface in closest proximity to the cathode 36. For this reason, these areas will be preferentially dissolved.

When using electropolishing methods, non-even material removal may cause a variety of problems which may have direct ramifications on article 30 integrity. Such problems may include, for example, non-compliant surface chemistry which may give rise to reduced environmental, fatigue crack and creep resistance behaviours; and localised thinning, which may give rise, for example, to non-compliance, eventual failure or rejection.

One particular method for analysing levels of material removal is based on the pick-up of material in the electrolyte 32. This is a bulk effect which does not reveal information about local article 30 thicknesses, but instead reveals only an average quantity of material removed over the article 30 surface, a factor which in its own right is not commonly or accurately known. Following processing, it is common for articles 30 construed to be outside of strict tolerance margins to be sent back into a further processing or repair loop so that, where possible, any irregularity may be rectified. Following repair, if an article 30 is still outside of tolerance, it is common for local material removal to be accomplished using adaptive 5+ axis machining methods, a process which is not always economically viable for smaller or less complex articles 30 which may otherwise be scrapped.

Referring again to FIG. 2, the anodic article 30 is mounted within an assembly such that the anode 30 is at least partially submerged within an 'undershot type' electrolyte 32, the electrolyte being held within a receptacle 34. The apparatus further comprises a cathode 36 charged by a power supply to create an electrical potential between the cathode 36 and the anode 30, and may comprise a means of dimensional inspection (not shown) forming part of a quality assurance system.

The power supply is preferably a low voltage DC power supply, supplying voltage between the cathode 36 and the anode 30. As per convention, the power supply is preferably capable of applying a reverse direction polarity in order to expel metal which has plated on the tip of the cathode 36. As such, during the machining operation, the voltage is periodically reversed, to remove metal build up from the tip of the cathode 36.

The means of dimensional inspection can operate via optical or physical means, or any such further method which may be suitable for such an application. It will also be appreciated that the quality assurance system is typically used any one or more of before, during and following completion of a given treatment, and is most typically employed as a separate and distinct process due to treatment processes and surface preparation of the anode 30 prior to inspection. In particular, it is often required that such measurement systems require the article 30 to be one or more of dry or specially prepared using specialist coatings before measurement takes place, thus ensuring that sufficient accuracy is achieved. In the arrangement shown, the means of optical inspection uses a detection system to allow selective and sequenced localised monitoring. Here, optical inspection of the article 30 via a detector informs a feedback control system which provides actuation of the cathode 36 by means of an actuation system 43. In such a manner, the cathode 36 may actuate at a local level so as to allow discrete control of the cathode 36, and hence aid in controlling material removal during the electrolytic process. Additionally, this permits the basis of a detection system for determining locally incomplete processing.

During use, the article 30 may be rotated in a clockwise or anticlockwise direction or dipped within the electrolyte 32 such that electrolyte 32 is provided in the working gap 68 between the cathode 36 and the anode 30. Thus, the facing surface of the positively charged anode 30 in closest proximity to the facing surface of the negatively charged cathode 36 is removed via an electrolytic interaction between the anode 30 and the cathode 36. The quantity of material removal varies depending upon one or more process parameters including the location and shape of the cathode 36 relative to the anode 30 (i.e. the working gap 68 at one or more locations), along with one or more of, for example, electrical potential, current, current density, charge and resistance between the cathodic tool 36 and the anodic article 30 at a given working gap 68. Further factors can also include processing time, speed of rotation, temperature, electrolyte 32 flow rate and/or pressure and electrolyte 32 chemistry.

The working gap 68 requires control of current supplied to the cathodic tool 36 to control current density. The electropolishing arrangement shown comprises a cathodic tool actuation system 43 which can be multiplied or integrated into a repeating comb-type electrode. The comb-type electrode comprises one or more cathodic tools 36, each cathodic tool 36 further comprising a spring, resilient member or retractable member 42 such that the cathodic tool 36 can be radially displaced relative to the component. Optionally, the spring, resilient member or retractable member 42 can be protected from the process fluid to prevent fouling by sludge from metallic ions or reaction. Such protection can be provided by an additional protective covering or coating applied to the surface of the cathodic tool 36. In this way, the protective covering or coating is at least partially conductive to provide electrical contact between the cathodic tool 36, the electrolyte and/or the anodic article 30. Each cathodic tool 36 can be contoured to at least partially match the surface of the finished anodic article 30, or can alternatively comprise a radiused tip which may be further articulated relative to the component, or vice-versa, to achieve a required surface contour or provide a required surface feature. Additionally or alternatively, one or more cathodic tools 36 can be independently displaced relative to the component, or comb-type electrode can instead be operated as a combined unit. The heights of one or more of the cathodic tools 36 can be varied, either to pre-set points or by varied displacement during processing in conjunction with a further automation and/or feedback system. In a further example, one or more of the cathodic tools 36 can be self-adjusting in a 'resilient finger or member' fashion. As such, the presently described apparatus may be used to treat axisymmetric and non-axisymmetric articles 30 alike. If self-adjusting, one or more cathodic tools 36 may comprise a spring or resilient member to maintain positioning of the cathodic tool 36 relative to the anodic article 30 at one or more radial positions of the actuation system 43.

Also shown is an electrolyte feed 69 which directs electrolytic fluid towards the working gap 68. The electrolyte feed 69 is fed by an electrolyte 32 recirculation system which removes electrolyte 32 from a containment vessel 34, before passing the electrolyte 32 through a flow control device 70 in order to control uptake of fluid from the vessel 34. The system further comprises a chemical replenishment device 71 to monitor fluid condition and/or replace degraded fluid when required. Also included is a temperature control device 72 to heat or cool the electrolyte 32 so that it is provided to the region surrounding the working gap 68 at the temperature required by the process. It will also be appreciated that such operations may not be integrated into such a feed system, and can instead operate independently or off-line. As such, a filtration system 73 is also shown which is optionally included as part of the electrolyte 32 recirculation system, the filtration system either aiding in venting collected hydrogen or removing waste products released into the electrolyte 32 during processing. Accordingly, the working gap 68 is shown to be provided with a controlled electrolyte feed 69 to permit escape of gases and removal of exhausted electrolyte 32.

FIG. 3 shows a comb-type electrode comprising the apparatus and two or more of the cathodic tools 36 as shown in FIG. 2. The anodic article 30 is shown to be mounted for axial rotation such that the actuation system 43 can remain stationary relative to one or more circumferential surfaces of the anode 30. Alternatively, the anodic article 30 can be displaced relative to the actuation system 43 and one or more cathodic tools 36 by a suitable displacement means, such as an articulating arm or a sliding platform, to alter the process parameters and control material removal accordingly. In either case, the electropolishing arrangement of FIG. 3 can further comprise a numerically controlled system learning step which is able to distinguish material or dimensional anomalies between articles 30 of substantially similar or differing geometry, and alter manufacturing conditions between the anode 30 and the cathode 36 as required.

The learning step can alternatively be acquired from and calibrated against surrogate material in a laboratory or from either a separate or combined expert system according to systems known within the art. In this instance, each cathode 36 is shaped to provide a known article 30 architecture, the article 30 being of a known material, loaded in a known manner onto a fixture with a known movement; or may alternatively provide the capability to simply adapt any number of manufacturing stages to suit an article 30 of irregular dimensions. Thus, the fixturing and positioning of the article 30 and/or electropolishing arrangement within the system is adaptable to suit a variety of articles 30 of variable size, geometry or material. However, in a further example, it will be appreciated that a singular electrode tool 36 may also be used in lieu of the depicted arrangement. In a yet further example, the cathode 36 may rotate or move relative to the anode 30.

In a further example, the electropolishing arrangement may be provided with pre-existing CAD/CAM information or a shaped cathodic tool 36 such that the contours expected of the anode 30 following treatment are known following one or more pre-determined relative movements between the cathode 36 and the anode 30. Furthermore, the cathode 36 can also be at least partially contoured to provide one or more corresponding geometric contours in the final shape of the anode 30. In this way, relative movement between the cathode 36 and the anode 30 will ensure that material is removed from the article 30 according to the profiled shape of the cathodic tool 36 facing the article 30. In this way, the profiled shape of the cathodic tool 36 facing the article 30 is replicated in the facing surface of the anodic article or workpiece 30.

Optical inspection methods are, in some examples, either supplemented or replaced by an electrical detection, monitoring and feedback system, hereafter referred to as the automated feedback system, forming part of an automated actuation system 43. The automated feedback system controls one or more of the cathode 36 and the anode 30 via the actuation system 43 to control relative movement therebetween. Following one or more of an electrical or geometrical response from one or more of the feedback or actuation system 43, an actual working gap 68 value is determined, and the actual value measured against a target value by the control system.

One or more such target values may be determined 'online' in accordance with a system-determined treatment regime according to the specific geometry or geometric deviation of the component, that is as part of the automated system 43, or 'offline'. Such offline target values can be provided in the form of a program or set of instructions and/or coordinates provided to the system 43. Such online target values can be provided and/or analysed by one or more electrical transmission monitoring methods. Such methods include monitoring the electrical response between the cathode 36 and the anode 30 using, for example, a potentiometer, potentiostat (providing comparison to a reference electrode) or any such similar equipment. Using this method, the current transmitted to cathode 36 from the anode 30 varies according to process parameters including working gap 68. By calibrating the electrical response (according to known process parameters) between the cathode 36 and the anode 30 with known or measured values for working gap 68, the system 43 can correlate the electrical response against working gap 68. As such, local electrochemical conditions in the working gap 68 may be one or more of monitored and/or adjusted by the system 43 to alter or correct operating conditions to meet a predetermined condition, target value, or quantity of material removal as specified by a user input, automated or numerically derived command. Alternatively, electrical response values may be calibrated against working gap 68 offline and fed into the feedback, actuation 43, or control system such that actual data may be correlated with input data to derive a value for working gap 68. In this way, a machine learning step can be additionally or alternatively included. In such a step, the system compares against one or more process signatures for parts with one or more of similar alloy and geometric contours to identify particular components. In this way, the system can check for component, electrical or working gap 68 variation, either continuously or after one or more increments of time during the material removal process. In gathering this information, the cathodic tool 46 may make a pre-programmed series (or continuous) movement relative to the component.

The system 43 provides the ability for the system to locally detect, measure and provide relative movement of the cathode 36 relative to the anode 30, or vice versa, to control or alter the working gap 68. Relative alteration of any such process parameter may be provided as either a series of discrete or continuous alterations or movements to monitor and/or adjust the electrochemical conditions or process parameters within the working gap 68. Using the aforementioned electrical transmission monitoring methods, the electrochemical operating conditions between the anode 30 and the cathode 36 may be monitored to allow a working gap 68 reading to be one or more of interpreted or derived by one or more of the detection 38, feedback and actuation 43 systems.

Also shown in FIG. 3 is a gas plenum chamber at the base of the vessel 34, the gas plenum chamber comprising at least one orifice 74 to aerate or agitate the electrolyte 32. Such aeration or agitation of electrolyte 32 within the vessel 34 acts to continually replenish the chemical constituents within the working gap 68, and particularly at the active surface of the anode 30 and cathode 36. It will also be appreciated that such a system can also be used with the single-type electrode shown in FIG. 4.

Along with working gap 68, the arrangement can be additionally configured to alter one or more process parameters according to requirements. Such process parameters include, for example, electrical potential, current, current density, charge and resistance between the cathodic tool 36 and the anodic article 30 at a given working gap 68. Further factors can also include processing time, speed of rotation, temperature, electrolyte 32 flow rate and/or pressure and electrolyte 32 chemistry. In this way, the detection 38, feedback and actuation 43 systems may monitor and/or change any one or more of the parameters of processing time, speed of rotation, temperature, electrolyte 32 flow rate and/or pressure, and electrolyte 32 chemistry.

To correct operating conditions to meet a predetermined condition, the feedback, actuation 43 or control system may also access one or more of pre-existent or real-time online or offline data. Such data can be used to characterise a perceived delta by correlating the actual electrical response and/or working gap 68 against the targeted electrical response and/or working gap 68, such that any disparity between the two values may be identified. Once a disparity has been identified, the control system may calculate the relative adjustment required between the article 30 and the cathode 36 (or vice versa) in order to bring the actual electrical response and/or working gap 68 into line with the targeted electrical response and/or working gap 68.

It will be appreciated that the feedback, actuation 43 or control system may, in the described manner, compare the actual and targeted values for working gap 68, or may instead compare the actual electrical response with a targeted electrical response. It will also be appreciated that the feedback, actuation 43 or control system may be in constant or intermittent use, such that the system may continually or intermittently monitor and/or adjust one or more of the anode 30 or cathode 36 to meet predefined acceptance targets at continual or specific stages in the manufacturing process. It will be appreciated that multiple rotations or 'steps' of material removal reduce the likelihood of targeted values not being met. The feedback, actuation 43 or control system may, in a further example also compare values of detected roughness with a target roughness, and alter conditions accordingly.

Additionally or alternatively, system 43 may periodically re-calibrate the native or amplified electrochemical conditions between the anode 30 and cathode 36 against the working gap 68 reading by measuring the electrical outputs in a base state at varying stand-off distances relative to one or more reference electrodes. The monitored electrical outputs, electrical and/or electrochemical operating conditions between the cathode 36 and the anode 30 may then be compared with the calibrated response from the reference electrode such that in-process measurements can be made. As a finessing operation, re-validation may also include using multiple electrical modes with one or more of adaptable frequencies and polarity reversal in order to sufficiently calibrate the feedback, actuation 43 or control system.

Figure 4:
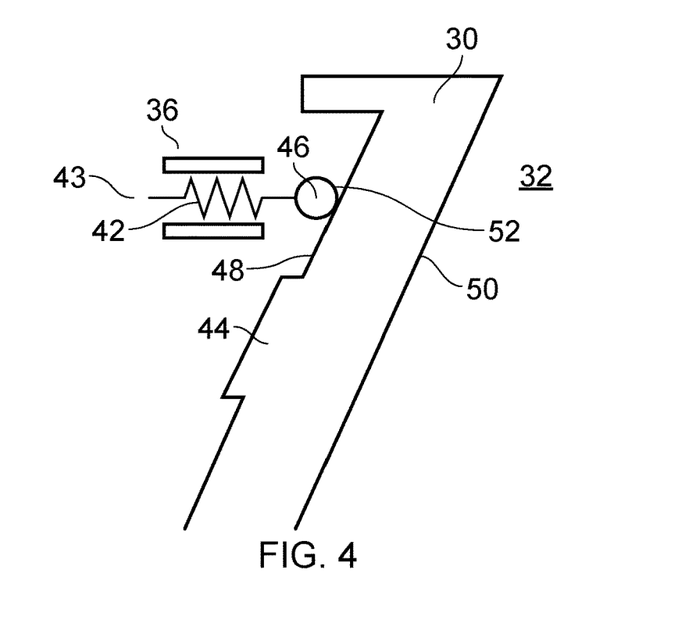
FIG. 4 shows a cathodic tool comprising a probe and a resilient member in accordance with an example of the present disclosure.

FIG. 4 shows a cross-section of a single cathodic tool 36, the contact point of the cathodic tool 36 being a stylus or ball-point head 46 in addition to a resilient portion or member 42. The arrangement as shown in FIG. 4 may be employed for a single cathodic tool 36, or as part of the cathodic tool actuation system 43 comprising two or more such cathodic tools 36.

One or more of the cathodic tools 36, either as an individual tool or as an assembly, can be controlled so as to be displaced relative to (i.e. either towards or away from) the anode 30 using one or more actuation systems 43. Alternatively, the anode 30 can be controlled so as to be displaced relative to the cathode 36. The actuation system 43 movements may be individually or globally actuated by, for example, a pneumatic, electromagnetic or mechanically actuated gearing system. It will also be appreciated that alternative arrangements may be envisaged, the arrangement comprising further actuation systems 43 to control movement of one or more cathodic heads 46 relative to the anodic article 30, thus controlling the working gap 68 and electrical response.

The cathodic tool 36 comprises a cathodic head 46, which may be used to treat external 48, and/or internal 50 faces of the anodic article 30. The anodic article 30 can include complex, recessed or extruded features such as bosses 44, or individual features of complex curvature or contour. To overcome any issues with the cathode 36 reaching areas of internal or external complex geometry or of limited accessibility, complex or articulated tooling can be used to articulate the cathode 36 to reach such areas and provide the required electropolishing effect.

In use, movement of the actuation system 43 and the resilient portion 42 forces the cathodic head 46 into positive engagement with the surface of the anodic article 30. When forcing the cathodic head 46 into a positive engagement with the anodic article 30, the working gap 68 is controlled by the shape and construction of the cathodic head 46 so as to be maintained at the required distance from the anodic article 30. To control the working gap 68, the cathodic head 46 may further comprise a protective portion 52 around the cathodic head 46. The protective portion 52 allows the cathodic head 46 to be pressed directly against the anodic article 30 in order to set the correct working gap 68. In this way, the protective portion 52 can also protect the article 30 from damage via interaction of the article 30 with the cathodic head 46. It will therefore be appreciated that the protective portion 52 comprises a material which is at least partially softer than the article 30. As such, the material forming the cathodic head 46 in contact with the metallic article can be of polymeric or elastomeric construction.

To provide sufficient transfer of electrons across the working gap 68, along with sufficient material removal and transfer of waste products, the protective portion 52 can be conductive and/or at least partially porous to allow electrolytic contact between the cathode 36 and the anode 30 via the electrolyte 32. Alternatively, the protective portion 52 can be thin, so providing a protective layer over the cathodic head 46 without substantially affecting electrical transfer between the cathode 36 and the anode 30.

In an alternative arrangement, the protective portion 52 can be at least partially insulating. By utilising a further cathodic head guide portion, member or active working gap 68 control as previously described to control the working gap 68, it is possible to maintain a set offset between the anodic article 30 and the cathode 36 whilst also allowing electrolytic solution to be maintained within the working gap 68. By exposing the cathodic head 46 to a sufficient negative charge in sufficient proximity of the positively charged anodic article 30, with electrolytic solution 32 maintained within the working gap 68, material removal will be observed.

In both the cases of the conductive or insulated cathodic tool 36 or cathodic head 46 as part of the cathode 36, instead of the cathode 36 itself providing a working gap 68, the working gap 68 can be provided by one or more datum positions incorporated within or located adjacent to the cathode 36. In this way, the cathode 36 may be built in to a further tool to maintain the cathode 36 at a set position relative to the anodic article 30, providing a standard working gap 68 and electrolyte 32 therebetween. Such a further tool can incorporate one or more rollers, wheels, or a frame around the cathode 36 to provide ease of movement across the surface of the anodic article 30.

According to determined working gap 68 and/or monitored electrochemical conditions between the cathode 36 and the anode 30, the actuation system 43 moves the single cathodic tool 36, or cathodic tool actuation system 43 comprising two or more such cathodic tools 36, towards or away from the anode 30. Such movement can be to alter or correct working gap 68 and/or monitored electrochemical conditions between the one or more cathodic tools 36 and the anodic article 30 to meet a targeted operating condition or value. In the case of a spring or resilient member 42, when brought into contact with the anodic article 30 and withdrawing the sprung or resilient member 42 from this point, the strain in the member shall reduce until the fully extended position is met. Continued withdrawal past this point ensures that the cathodic tool 36 will be lifted from the surface of the anodic article 30. Thus, material removal will occur only if the cathodic head 36 is within sufficient proximity of the article 30 to provide a sufficient electron transfer, or electrical interaction to remove material. By tailoring the resilient member 42 to suit the required working gap 68 and provide only the required electrical interaction at the fully extended position (i.e. providing little or no electrolytic interaction), it is possible to limiting the quantity of material that may be removed whilst providing a fail-safe material removal mechanism.

Referring again to FIG. 4, the single cathodic tool 36, or cathodic tool actuation system 43 comprising two or more such cathodic tools 36 may be varied in cycle as required by, and in accordance with the control system. Such variation in cycle can be provided from full application of one or more of current or potential along the length of the tool to local and sequential current or potential application in one or more nominated cathodic heads 46.

Figure 5:
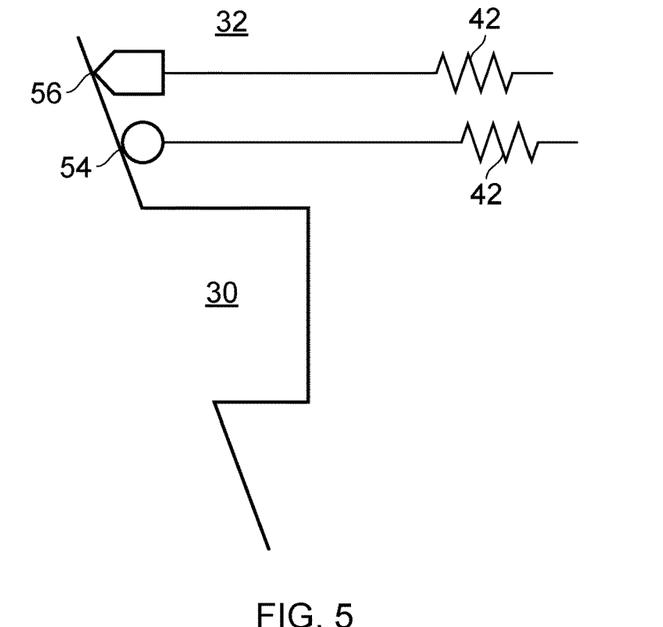
FIG. 5 shows cathodic tools comprising a roller arrangement and a datum based probe arrangement, the tools comprising a resilient member in accordance with an example of the present disclosure

FIG. 5 shows a plurality of sprung cathodic heads 54,56, the cathodic heads including a roller-ball tip arrangement 56 and a datum-based probe arrangement 54 in accordance with an example of the present disclosure. As shown in FIG. 5, the probe arrangement 54 allows the probe to roll over the surface of the article 30 with complete manoeuvrability. The use of a roller-ball 56 provides a rolling of the ball over the surface, and hence a reduction in the friction between the roller-ball 56 and the anodic article 30. Accordingly, the use of a roller ball reduces the likelihood of scratching or damaging the article, whilst also allowing electrolyte solution 32 to remain present between the anodic surface of the article 30 and the cathode 36. This provides the further advantage that the probe 54,56 may maintain a known or constant stand-off distance between the anode 30 and the cathode arrangement 36 in the manner previously described. Such a mechanism may aid in providing at least a substantially constant electrical response between the anode 30 and the cathode 36 during treatment. As shown in FIG. 5, the probe arrangement 54, 56 may use a similar spring 42 arrangement to that previously described in FIG. 4 to force the cathodic heads 54, 56 into positive engagement with the anode 30. In a similar manner, the roller-ball tip arrangement 56 can use similar materials to those for the probe assembly shown in FIG. 4.

Figure 6:
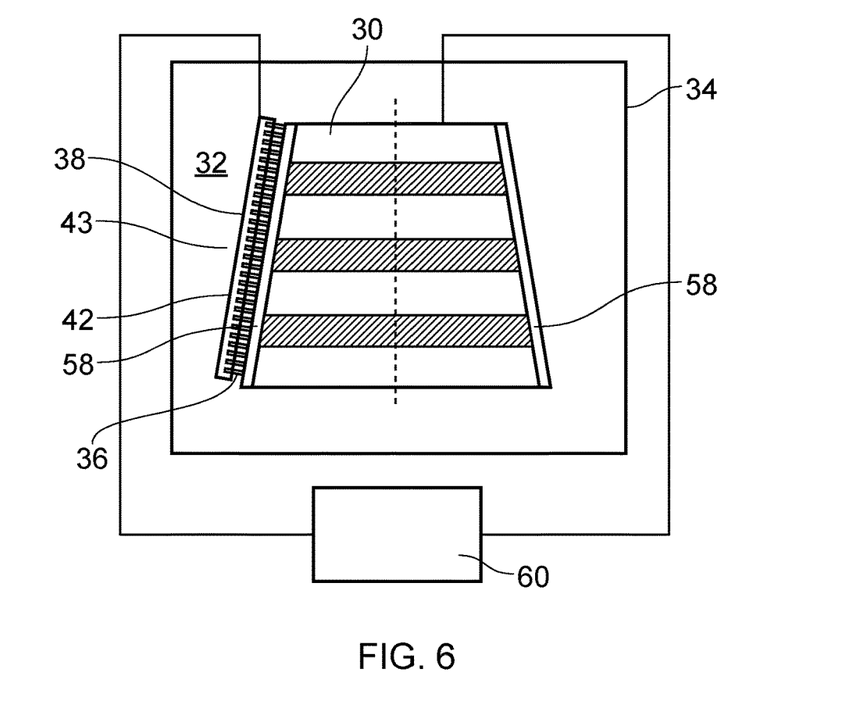
FIG. 6 shows a cross-section of the assembly of FIG. 2; and, FIG. 7 shows an outlined process for electropolishing of an article.

FIG. 6 shows a cross-section of an assembly according to the present disclosure. The anodic article 30 is at least partly contained within a vessel 34, the cathodic tool 36 and at least the treatment area on the anodic article/workpiece 30 being at least partially submersed within the electrolyte solution 32. FIG. 6 also shows the single cathodic tool 36, or cathodic tool actuation system 43 comprising two or more such cathodic tools 36 at least partially matching the surface contours of the anodic article 30. Accordingly, FIG. 6 also shows the area of material to be removed 58 from the periphery of the anodic article 30, wherein the cathodic tool 36 would ordinarily reach their fully extended position. Where the cathodic tools 36 are in independently or dependently displaced relative to the article 30 to control the working gap 68 therebetween in order to provide the required anodic article 30 contour, the required surface contour is provided by the cathodic tool 36 as controlled by the automated feedback system, forming part of an automated actuation system 43.

Referring again to FIG. 2, and in addition to the arrangement shown in FIGS. 2 to 6, it will be appreciated that each independent cathode tool 36 may be independently withdrawn or inserted as required, or may instead be operated as a combined automated actuation system 43. As such, the presently described apparatus may be used to treat axisymmetric and non-axisymmetric articles alike. Also shown is the detection 38, feedback 60 and actuation units 43, collectively forming a control system as shown and described in FIGS. 2 to 6, the units being combined into a singular functional unit for analysing the anodic article 30, evaluating the offset between actual and target values, and altering the offset of one or more of the cathodic fingers 36 in order to at least partially remedy the observed delta. In this way, the feedback system may operate by monitoring one or more of optical, sensor, or electrically data to determine working gap 68 or component conformance. In particular, the feedback unit 60 is shown to be electrically connected to both the cathode 36 and anode 30 to monitor the electrical process parameters between the cathode 36 and the anode 30, particularly the current transmitted to cathode 36 from the anode 30 according to process parameters including working gap 68. In this way, once a disparity has been identified, the control system may calculate the relative adjustment required between the article 30 and the cathode 36 (or vice versa) in order to bring the actual electrical response and/or working gap 68 into line with the targeted electrical response and/or working gap 68.

Figure 7:
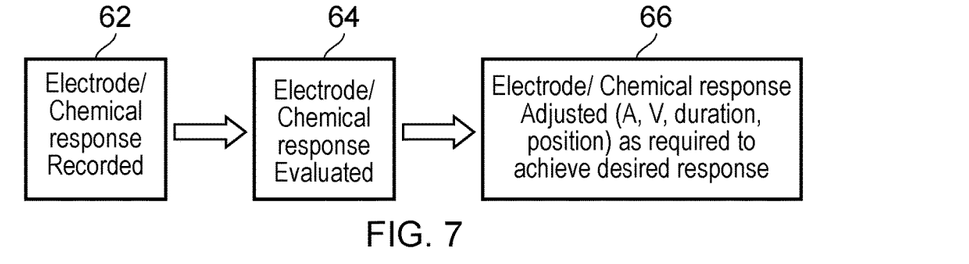

FIG. 7 outlines a process for electropolishing of an article, comprising the steps of recording a response 62, evaluating a response 64 and adjusting one or more electrodes 66 to at least partially remedy the observed delta.

In more detail, the process of controlling a working gap 68 between one or more cathodic tools and an anodic workpiece in an electrochemical material dissolution process comprises the steps of:

Providing a cathodic tool and an anodic workpiece defining a working gap 68 therebetween, the cathodic tool 36 and the workpiece 30 being at least partially immersed in a conductive electrolyte solution 32.

In this step, the process provides a cathodic tool 36 and an anodic workpiece 30. The step includes inserting the component 30 into a conductive electrolyte solution 32 or introducing the conductive electrolyte solution 32 to the component 30 in order to provide an electrolyte solution 32 within the working gap 68. The inclusion of an electrolyte solution 32 within the working gap 68 provides electrical contact between the cathodic tool 36 and the anodic workpiece 30.

Providing a negative electrical potential to the cathodic tool 36.

In this step, the provision of the negative electrical potential to the cathodic tool 36 provides an increased potential between that of the cathodic tool 36 and the anodic workpiece 30. In this way, once a sufficient negative electrical potential has been provided to the cathodic tool 36, electrons can cross the working gap 68 between the cathodic tool 36 and the anodic workpiece 30.

Monitoring one or more of the electrical potential, current, current density and charge between the cathodic tool 36 and the anode 30 to determine the working gap 68 between the cathodic tool 36 and the anode 30.

In this step, the process parameters are monitored at both the cathode 36 and the anode 30 to determine one or more of electrical potential, current, current density and charge at each respective position. Following the monitoring of the process parameters at each respective position, a delta representing the difference in one or more process parameters between the cathode 36 and the anode 30 is monitored, with the delta of the or each respective parameter being assessed against further data to provide a value for the working gap 68. Hence, the method monitors one or more varying process parameters, electrolyte chemistry and/or electrical inputs to determine the working gap 68.

Controlling one or more process parameters to maintain one or more of the working gap 68 and electrochemical working conditions between the cathodic tool 36 and anodic workpiece 30 at a targeted value.

In this step, the working gap is monitored in accordance with one or more varying process parameters, electrolyte chemistry and/or electrical inputs. Should the working gap or amount of material removed not conform to that expected or required at one or more respective points in the electrochemical material dissolution process, the working gap 68 or one or more process parameters and/or electrical inputs are modified or varied to bring the working gap 68 or amount of material removal into line with a targeted value.

The electopolishing tool and supporting system described in this patent allows for a high degree of flexibility in the choice of materials, the configuration, the operating conditions and the mode of operation of the present disclosure. It will be appreciated by someone knowledgeable in the art that the present disclosure may take many forms without deviating from the scope of this invention.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of controlling a working gap between at least one cathodic tool and an anodic workpiece in an electrochemical material dissolution process, the method comprising:

at least partially immersing the at least one cathodic tool and the anodic workpiece in a conductive electrolyte solution, the at least one cathodic tool comprising a plurality of cathodic heads defining a working gap between each of the cathodic heads and the anodic workpiece;

independently varying the working gap between each of the cathodic heads and the anodic workpiece according to electrochemical working conditions or offset values;

providing a negative electrical potential to the at least one cathodic tool;

monitoring one or more of the electrical potential, current, current density and charge between the at least one cathodic tool and the anodic workpiece to determine the working gap between the at least one cathodic tool and the anodic workpiece; and, controlling one or more process parameters to maintain one or more of the working gap and electrochemical working conditions between the at least one cathodic tool and the anodic workpiece at a targeted value.

2. The method as claimed in claim 1, wherein the anodic workpiece is at least partially comprised of a metallic material.

3. The method as claimed in claim 1, wherein the anodic workpiece comprises a metallic aerospace article such as, for example, a casing, pipe, disc, bladed disk, drum, bladed drum, ring, bladed ring or aerofoil.

4. The method as claimed in claim 1, the process parameters comprising, for example, one or more of working gap, electrical potential, current, current density, charge, resistance, cathodic tool feed rate, processing time, cathodic tool depth, electrolyte flow rate and/ or pressure, temperature and electrolyte chemistry.

5. The method as claimed in any claim 1, wherein the controlling step comprises comparing or correlating one or more of the electrical potential, current, current density and charge between the at least one cathodic tool and the anodic workpiece with sample or real-time data to convert the monitored electrical output into an estimation of the working gap.

6. The method as claimed in claim 1, wherein the monitoring system comprises one or more of a drive, actuation, spring, resilient member or reciprocating mechanism to increase or decrease the working gap according to the monitored electrical output.

7. The method as claimed in claim 1, wherein each of the plurality of cathodic heads comprises an insulating tip, guide portion or member to provide the working gap between each of the plurality of cathodic heads and the anodic workpiece.

8. The method as claimed in claim 1 wherein the electrolyte has a pH of 7or less.

9. The method as claimed in claim 1 wherein the electrolyte has a pH of 7 or more.

10. The method as claimed in claim 1 wherein the electrolyte comprises a molten salt solution.

11. The method as claimed in claim 1 wherein a facing surface of each of the at least one cathodic tool or each of the plurality of cathodic heads is at least partially contoured, the facing contour of the or each at least one cathodic tool or each of the plurality of cathodic heads at least partially replicating the desired shape of at least a portion of the anodic workpiece.

12. An electrochemical material dissolution apparatus configured to remove material from a surface of an anodic workpiece, the apparatus comprising:

at least one cathodic tool comprising a plurality of cathodic heads defining a working gap between each of the cathodic heads and the anodic workpiece, the at least one cathodic tool and the anodic workpiece being at least partially immersed in a conductive electrolyte solution;

an actuation system configured to independently vary the working gap between each of the cathodic heads and the anodic workpiece according to electrochemical working conditions or offset values;

an electrical source configured to provide one or more of a controllable voltage and a controllable current to the at least one cathodic tool;

an electrical detection device configured to monitor one or more of electrical potential, current density, charge and current applied to the at least one cathodic tool so as to determine a working gap between the at least one cathodic tool and the anodic workpiece;

the electrical detection device further comprising a feedback system and the actuation system configured to control process parameters to maintain one or more of the working gap and electrochemical working conditions between the at least one cathodic tool and the anodic workpiece at a targeted value.

13. The method as claimed in claim 7, wherein the insulating tip has a rounded surface.

14. A method of controlling a working gap between at least one cathodic tool and an anodic workpiece in an electrochemical material dissolution process, the method comprising:

at least partially immersing the at least one cathodic tool and the anodic workpiece in a conductive electrolyte solution, the at least one cathodic tool comprising a plurality of cathodic heads defining a working gap between each of the cathodic heads and the anodic workpiece, each of the plurality of cathodic heads comprising an insulating tip;

providing a negative electrical potential to the at least one cathodic tool;

monitoring one or more of the electrical potential, current, current density and charge between the at least one cathodic tool and the anodic workpiece to determine the working gap between the at least one cathodic tool and the anodic workpiece; and, controlling one or more process parameters to maintain one or more of the working gap and electrochemical working conditions between the at least one cathodic tool and the anodic workpiece at a targeted value.

15. The method as claimed in claim 7, wherein the insulating tip has a rounded surface.

* * * * *